United States Patent
Teichmann et al.

(10) Patent No.: US 7,605,917 B2
(45) Date of Patent: Oct. 20, 2009

(54) SPECTROMETER

(75) Inventors: Helmut Teichmann, Zurich (CH); Dietmar Hiller, Zurich (CH); Ulrich Starker, Zurich (CH)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 251 days.

(21) Appl. No.: 11/596,066

(22) PCT Filed: Jul. 8, 2005

(86) PCT No.: PCT/JP2005/013096
§ 371 (c)(1),
(2), (4) Date: Nov. 9, 2006

(87) PCT Pub. No.: WO2006/009089
PCT Pub. Date: Jan. 26, 2006

(65) Prior Publication Data
US 2007/0211250 A1    Sep. 13, 2007

(30) Foreign Application Priority Data
Jul. 16, 2004  (JP) ............................. 2004-210687

(51) Int. Cl.
*G01J 3/18* (2006.01)
(52) U.S. Cl. ....................... 356/326; 356/328
(58) Field of Classification Search ............. 356/326, 356/328, 334
See application file for complete search history.

(56) References Cited

U.S. PATENT DOCUMENTS

| 4,633,078 A | 12/1986 | Ferber |
| 4,902,136 A * | 2/1990 | Mueller et al. ............... 356/419 |
| 5,831,729 A | 11/1998 | Kuze |
| 6,081,331 A | 6/2000 | Teichmann |
| 7,262,845 B2 * | 8/2007 | Avrutsky ................... 356/328 |
| 2003/0117621 A1 | 6/2003 | Inamoto |

FOREIGN PATENT DOCUMENTS

| EP | 0 313 968 | 5/1989 |
| EP | 1 041 372 | 10/2000 |
| JP | 4-294223 | 10/1992 |
| JP | 9-250946 | 9/1997 |
| JP | 2000-65642 | 3/2000 |
| JP | 2000-298066 | 10/2000 |

\* cited by examiner

*Primary Examiner*—L. G Lauchman
(74) *Attorney, Agent, or Firm*—Drinker Biddle & Reath LLP

(57) ABSTRACT

A spectrometer 1A is made up of: an optical body 10 within which a light separation path is set along which an object light to be separated propagates; a light entry slit 16 through which the object light enters; a diffraction grating 17 for spectrally separating the incident object light; and a photodiode array 18 for detecting the object light separated by the diffraction grating 17. As an optical member for optically interconnecting the optical body 10 and the photodiode array 18, an optical connection member 20 is provided, with its light entry surface 21 for the separated object light in contact with the upper surface 11 of the optical body 10, with its light exit surface 22 in contact with the photodiode array 18, with the light exit surface 22 tilted by a specified angle relative to the light entry surface 21. Thus, the spectrometer capable of bringing about sufficient accuracy of placing optical elements in a simple constitution while bringing down cost is realized.

6 Claims, 8 Drawing Sheets

(a)

(b)

SPECTROMETER

TECHNICAL FIELD

This invention relates to a spectrometer for spectrally separating incident light.

BACKGROUND ART

A spectrometer is an optical device for spectrally separating light, an object of measurement, into spectral components using dispersing elements such as prisms or diffraction gratings. By detecting the spectral components of light separated with the dispersing elements, the wavelength distribution of the light or the intensity of specific wavelength component of the light can be found out. Thus, spectrometers are used in a variety of application areas (for example, See Document 1: JP-A-2000-298066, Document 2: JP-A-Hei-4-294223, Document 3: JP-A-2000-65642).

DISCLOSURE OF THE INVENTION

In recent years, development of small-sized spectrometers to be applied to various spectrometric measuring devices and measuring systems is in progress. One of advantages of the small-sized spectrometer is the possibility of reducing cost as compared with the conventional spectrometers. If the cost of the spectrometer can be reduced, it becomes possible to apply the spectrometer to fields to which the spectrometer could not be applied so far in terms of cost. Ways of reducing the cost of the spectrometer can be enumerated as, for example: constituting the spectrometer using inexpensive materials, easing tolerances for the components of spectrometer to facilitate its manufacture, etc.

On the other hand, in the spectrometer, various optical elements such as the light entry section and the photodetector that constitute the spectrometer must be placed with high positioning accuracy. In small-sized spectrometers, the placement accuracy for such optical elements is required for example down to 10 μm or less. To bring about such a placement accuracy, some constitutions are proposed. For example, in the above Document 1, a mounting constitution is disclosed to place light entry, diffraction grating, photodetector with high accuracy. With such a constitution, however, the spectrometer cannot be manufactured at a low cost.

The Document 2 discloses a constitution in which a gap is provided between a surface of a support body to which a diffraction grating is attached and a diode array serving as a photodetector. With such a constitution, however, if the gap between the support body and the photodetector is filled with air, transmittance of light lowers due to reflection at the boundary surface and may produce ghost images. Or, if this gap is filled with polymer such as epoxy resin, a considerable thickness of about 100 μm is required to secure the tolerance of entire spectrometer. The thick adhesive layer also raises problems in such points as heat cycle of the spectrometer, long-term stability, durability against severe environment, etc.

The Document 3 discloses a constitution of the spectrometer that brings about high reliability by causing light as the object of separation to propagate through a transparent optical body. This constitution is excellent in thermal stability and others. In the case of interconnecting optical bodies, it is possible to do so using a thin layer of refractive index matching optical adhesive or the like without affecting the spectrometer characteristic. However, since this constitution utilizes propagation of light through a single medium, the gap or the like cannot be used for adjusting the placement of optical elements with high accuracy.

This invention has been made to solve the above problems with an object of providing a spectrometer capable of bringing about sufficient placement accuracy of optical elements in a simple constitution while reducing cost.

To accomplish the above object, the spectrometer according to this invention comprises: (1) an optical body made of a material that permits passage of an object light, to be an object of light separation, of wavelengths within a specified range, with a light separation path for the object light to propagate set within the optical body; (2) a dispersing element provided in a specified position on the light separation path; (3) a light entry means located on the entry side of the light separation path to permit the object light to enter; (4) a light detection means located on the exit side of the light separation path to detect the object light entering through the light entry means and spectrally separated with the dispersing element; and (5) an optical connection member for optically interconnecting the optical body and the light detection means, in which (6) the optical connection member is formed so that a light entry surface for the object light separated with the dispersing element is in contact with a specified surface of the optical body, a light exit surface on the opposite side of the light entry surface is in contact with the light detection means, with the light exit surface tilted by a specified angle relative to the light entry surface.

The above-described spectrometer is constituted that light to be the object of separation is caused to propagate through the optical body, and the optical elements including the light entry means, the dispersing element, and the light detection means are placed in specified positions relative to the optical body. Thus, a spectrometer is brought about that is excellent in stability and reliability. On the exit side of the light separation path set within the optical body, the light detection means is not placed directly on the surface of the optical body but the optical connection member with its light exit surface tilted relative to its light entry surface is interposed between the optical body and the light detection means. With such a constitution, it is possible to adjust the placement of the light detection means in the light path direction relative to the light separation path in the optical body by changing the position of the optical connection member in the tilt direction (the direction orthogonal to the direction of constant thickness of the optical connection member). In this way a spectrometer is provided that is capable of bringing about sufficient placement accuracy of the optical elements with a simple constitution while reducing cost.

Here, in the spectrometer of the above constitution, it is preferable to constitute the optical connection member such that reflected light, which is part of the object light coming from the dispersing element and being reflected at the light exit surface, propagates in a direction deviating from the light separation path. In this way, it is possible to prevent the influence of stray light produced at the light entry surface of the light detection means connected to the optical connection member.

Or, it is preferable to constitute the optical connection member such that the light exit surface lies along the focus line produced according to the wavelengths of the object light spectrally separated with the dispersing element. In this way, it is possible to favorably detect respective spectral components of the object light separated with the dispersing element.

BEST MODE FOR CARRYING OUT THE INVENTION

Figure 1:
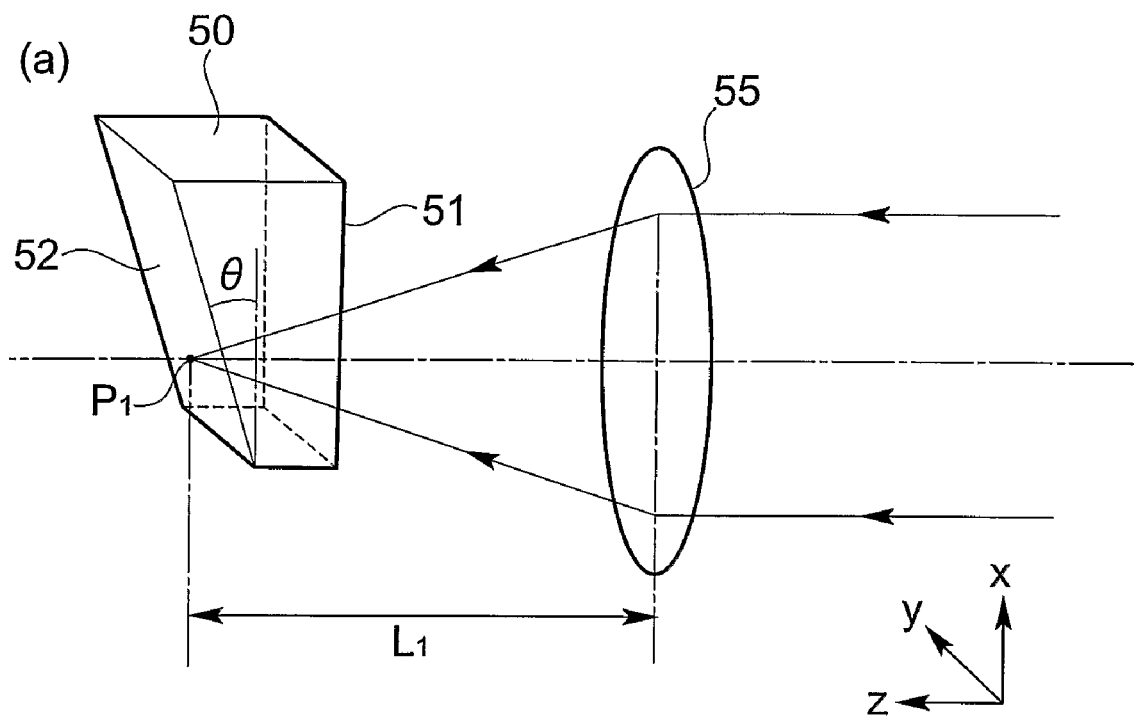
FIG. 1 is a figure showing a relationship between a wedge-shaped optical member and a focus position of an object light.
Figure 1:
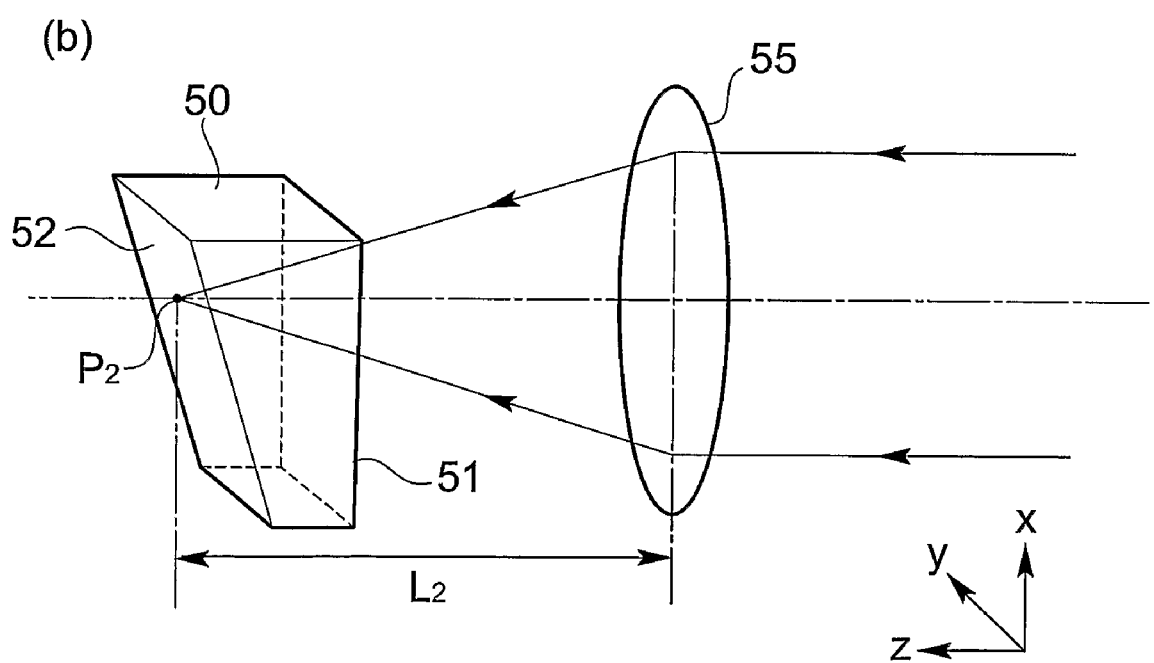

Preferable embodiments of the spectrometer according to the present invention are described in detail in reference to the appended drawings. In the explanation of drawings, the same elements are provided with the same reference numerals and their explanations are not repeated. Dimensional proportions in the drawings are not necessarily in agreement with those in the description.

First, the basic concept of the constitution of the spectrometer is described. In the spectrometer of this invention, a wedge-shaped optical member with its light exit surface tilted by a specified angle relative to its light entry surface is placed on a light separation path along which an object light to be spectrally separated propagates. Using the optical member, placement accuracy of optical elements relative to the focus position of the object light is improved.

FIG. 1 shows the relationship between the wedge-shaped optical member and the focal position of object light. In the optical system shown in FIG. 1, a focusing lens 55 and an optical member 50 are placed on the z-axis as the optical axis of the object light. The optical member 50 is of a wedge shape with its light entry surface 51 being at right angles to the z-axis and with its light exit surface 52 being tilted relative to the light entry surface 51. Specifically, the light exit surface 52 of the optical member 50 shown in FIG. 1 is tilted by an angle θ relative to the light entry surface 51 with the x-axis as the reference direction of tilt, and with the thickness of the optical member 50 increasing toward the positive direction of the x-axis.

As for the optical member 50 in the configuration (a) of FIG. 1, the focal distance $L_1$ is the distance from the lens 55 to the focal point $P_1$ of the object light. The optical member 50 is placed so that the focal point $P_1$ is located on the light exit surface 52. On the other hand, in the configuration (b) of FIG. 1, the focal length $L_2$ from the lens 55 to the focal point $P_2$ of the object light is greater than $L_1$ ($L_2 > L_1$). In this state, in comparison with the state shown in the configuration (a) of FIG. 1, the optical member 50 is displaced in the negative direction of the x-axis. This results in a greater thickness of the optical member 50 on the optical path of the object light, so that the focal point $P_2$ is located on the light exit surface 52. In other words, placing the wedge-shaped optical member 50 on the optical path along which the object light propagates makes it possible to adjust the constitution of the optical system concerning the focal point of the object light by using the optical member 50. A spectrometer using such an optical member of this invention is described below.

Figure 2:
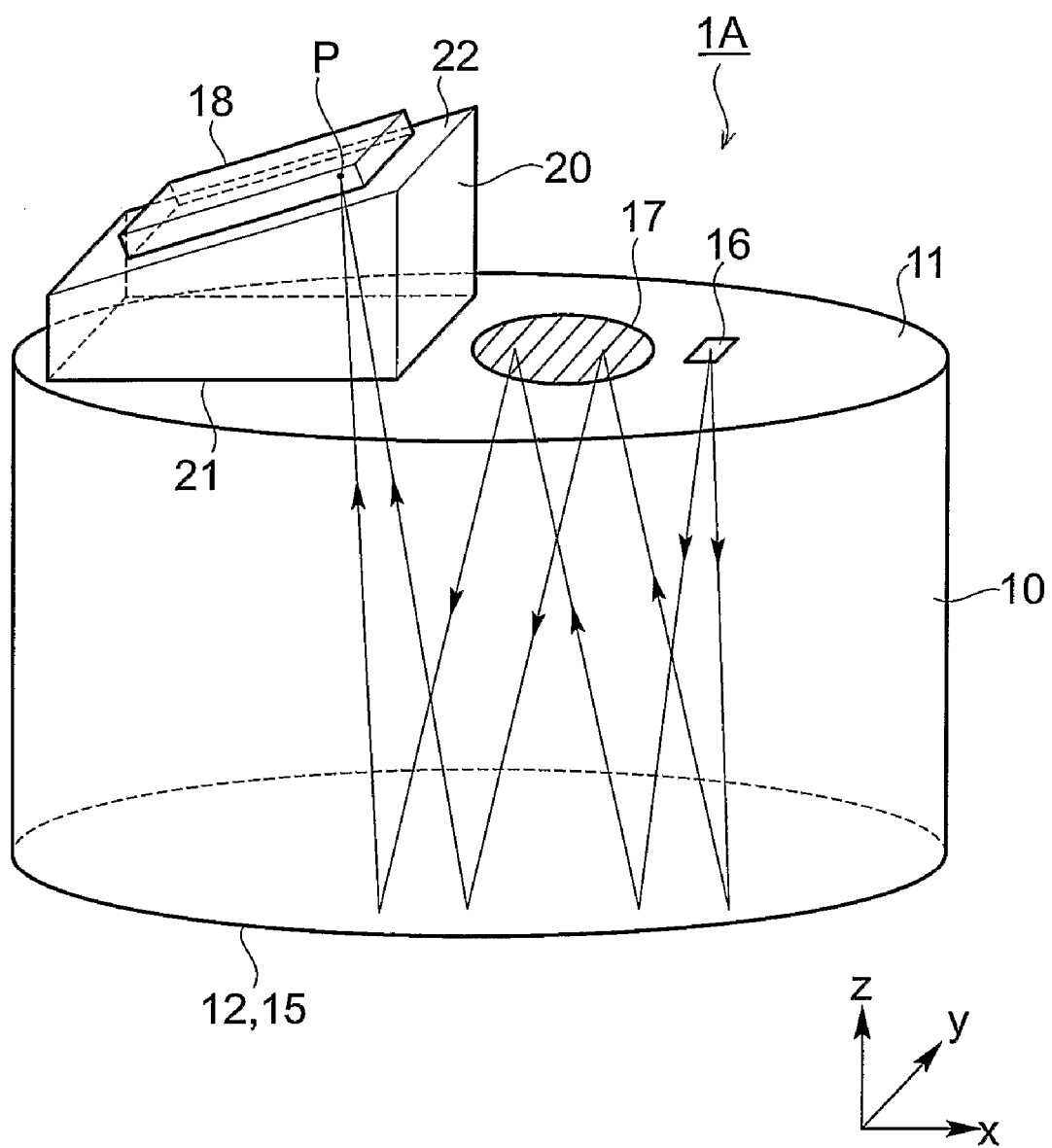
FIG. 2 is a perspective view showing a constitution of the first embodiment of the spectrometer.
Figure 3:
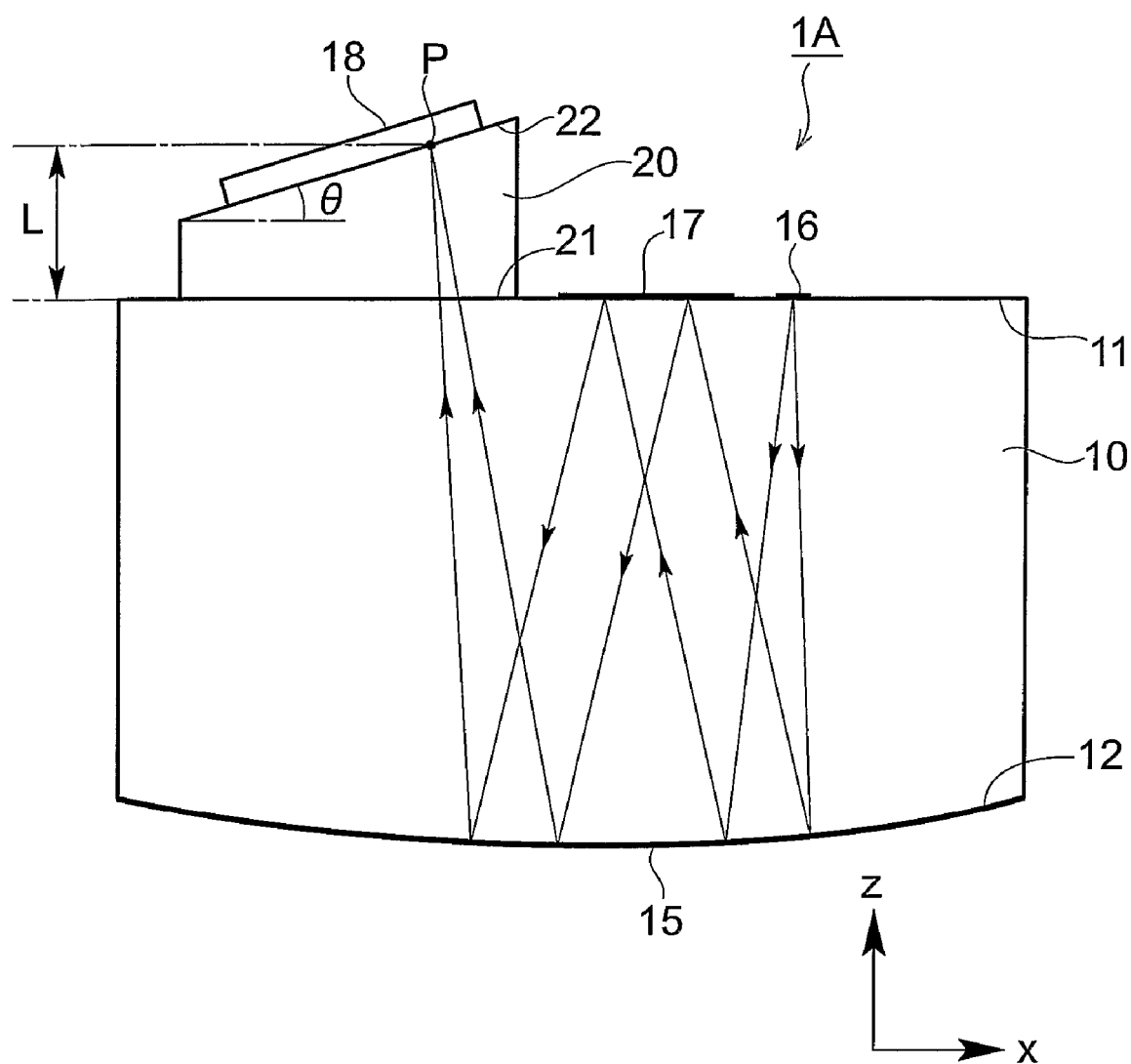
FIG. 3 is a side view showing a constitution of the spectrometer shown in FIG. 2.

FIG. 2 is a perspective view of the constitution of a first embodiment of a spectrometer according to this invention. For the convenience of explanation, x-axis, y-axis, and z-axis at right angles to each other are defined as shown in FIG. 2. When necessary for explanation, negative and positive directions of the x-axis are assumed to be left and right, negative and positive directions of the y-axis to be forward and backward, and negative and positive directions of the z-axis to be downward and upward, respectively. FIG. 3 is a side view of the spectrometer shown in FIG. 2 as seen from the negative side of the y-axis.

A spectrometer 1A of this embodiment comprises an optical body 10 and an optical member 20. In the spectrometer 1A shown in FIG. 2, the negative direction of the z-axis is the incident direction of light. The spectrometer 1A is arranged with an optical path (light separation path) along which light to be separated propagates being set in the medium of the optical body 10 to carry out spectral separation of object light.

The optical body 10 is made, in a solid cylindrical shape centered on the z-axis, of a glass material that permits passage of the object light of a specified wavelength range to be separated with the spectrometer 1A. In this embodiment, the upper surface 11 of the optical body 10 is made flat, and the lower surface 12 is made concave as seen from within the optical body 10 (that is convex toward outside). On the lower surface 12 of the optical body 10 is provided with a reflecting mirror 15 within a specified area to reflect the object light to be separated.

On the upper surface 11 of the optical body 10 are placed, in the order from right to left on the figure, a light entry slit 16, a diffraction grating 17, and the optical member 20 in specified positional relationship. The light entry slit 16 is located on the entry side of the light separation path set within the optical body 10 and serves as a light entry means for permitting the object light to be separated incident into the optical body 10. As the object light enters through the light entry slit 16, the light entry path into the optical body 10 of the incident object light is determined.

The diffraction grating 17 is a dispersing element placed in a specified position on the light separation path to separate into respective spectral components of the object light entering through the light entry slit 16. The diffraction grating 17 shown in FIG. 2 as an example is a reflection type planar diffraction grating formed on the upper surface 11 of the optical body 10 with the direction of light dispersion in the x-axis. The diffraction grating 17 may be constituted for example by forming a diffraction grating pattern such as a blazed grating on the upper surface 11 at the time of forming the optical body 10 followed by application of a reflective coating of aluminum or the like in the area where the pattern is formed.

A photodetector 18 is placed in a specified position above the upper surface 11 on the exit side of the light separation path relative to the optical body 10, the light entry slit 16, and the diffraction grating 17. The photodetector 18 is a light detection means for detecting the object light entering through the light entry slit 16 and spectrally separated with the diffraction grating 17. As the above photodetector 18, for example, a photodiode array (light detection elements array) is used in which a plural number of photodiodes (light detection elements) are arranged in the direction of x-axis in agreement with the direction of light dispersion with the diffraction grating 17.

With the above constitution, the object light to be separated entering through the light entry slit 16 along the light separation path in the optical body 10 is reflected with the concave reflecting mirror 15 on the lower surface 12, and reaches as collimated light the diffraction grating 17 serving as a dispersing element located on the upper surface 11. The object light, reflected with the diffraction grating 17 and at the same time separated, while converging through the concave reflecting mirror 15, is incident on the photodiode array 18. As the obtained spectral components of the object light are detected with respectively corresponding photodiodes of the photodiode array 18, spectroscopic measurement of the object light is carried out.

The spectrometer 1A is further provided with the above-mentioned optical member 20 interposed between the optical body 10 with the light separation path set within and the photodiode array 18 as the light detection means. The optical member 20 is an optical connection member for optically interconnecting the optical body 10 and the photodiode array 18 and is made of a glass material that permits passage of object light of wavelengths within a specified range. The optical body 10 and the optical connection member 20 are provided in an integrated form and in the state of being optically connected. Here, part of the light separation path from the light entry slit 16 to the photodiode array 18 is set within the optical connection member 20.

Specifically, the optical connection member 20 is constituted with its lower surface serving as a light entry surface 21 for the separated object light and with the upper surface, opposite the light entry surface 21, as a light exit surface 22. The optical connection member 20 is placed so that the light entry surface 21 is in contact with the upper surface 11 of the optical body 10 while the light exit surface 22 is in contact with the light entry surface of the photodiode array 18. By means of the above constitution, the optical connection member 20 optically connects the optical body 10 and the photodiode array 18 between the light entry surface 21 and light exit surface 22.

The optical connection member 20 is also formed in a wedge shape with its light exit surface 22 tilted by a specified angle θ (See FIG. 3) relative to the light entry surface 21 in the x-axis direction. In this way, the optical connection member 20 is formed so that its thickness in the z-axis, or the distance between the light entry surface 21 in contact with the upper surface 11 of the optical body 10 and any part of the light exit surface 22 increases toward the positive direction of the x-axis. The optical connection member 20 is placed, in consideration of the above-mentioned wedge shape, so that the focal point P of the object light, entering while converging from the concave reflecting mirror 15 to the photodiode array 18, is located on the light exit surface 22. In this way, the spectrally separated object light favorably enters the photodiode array 18 placed to be in contact with the light exit surface 22 of the optical connection member 20.

Effects of the spectrometer in the above embodiment are described below.

With the spectrometer 1A shown in FIGS. 2 and 3, the light to be the object of separation is caused to propagate within the optical body 10, and respective optical elements; the light entry slit 16, the diffraction grating 17, and the photodiode array 18, are placed in specified positions relative to the optical body 10 to constitute the spectrometer 1A. In this way, the spectrometer 1A of excellent stability and high reliability is brought about by constituting it with the optical body 10 through which the object light can propagate.

As for the exit side of the light separation path set within the optical body 10, the photodiode array 18 of the light detection means is not placed directly on the upper surface 11 of the optical body 10. Instead, the optical connection member 20 with its light exit surface 22 tilted relative to the light entry surface 21 is interposed between the optical body 10 and the photodiode array 18. The above constitution makes it possible, by changing the position of the optical connection member 20 in the x-axis direction, the direction of tilt (the direction orthogonal to the y-axis direction, the direction of constant thickness of the optical connection member 20), to adjust the placement of the photodiode array 18 relative to the light separation path within the optical body 10, and to adjust the position of entry of the object light into the photodiode array 18 in the z-axis direction as the light path direction. This makes it possible to bring about sufficient positioning accuracy of optical elements of the spectrometer 1A in a simple constitution. As the constitution of the spectrometer 1A is simplified, it is possible to reduce its cost.

For example, as for the spectrometer 1A, the focal point P of the object light on the exit side of the light separation path is located as shown in FIG. 3 at a distance L from the upper surface 11 of the optical body 10. Here, the focal position of the object light varies to some extent depending on the tolerances for dimensions of respective constituents of the spectrometer 1A, such as the height of the optical body 10, curvature of optical surface, and displacement of the light entry slit 16. As for the focal point of the object light, even if the distance from the upper surface 11 of the optical body 10 to the focal point P deviates from L, the spectrometer 1A of the above constitution makes it possible to adjust, by the use of the optical connection member 20, the constitution of the optical system for the focal point of the object light.

Figure 4:
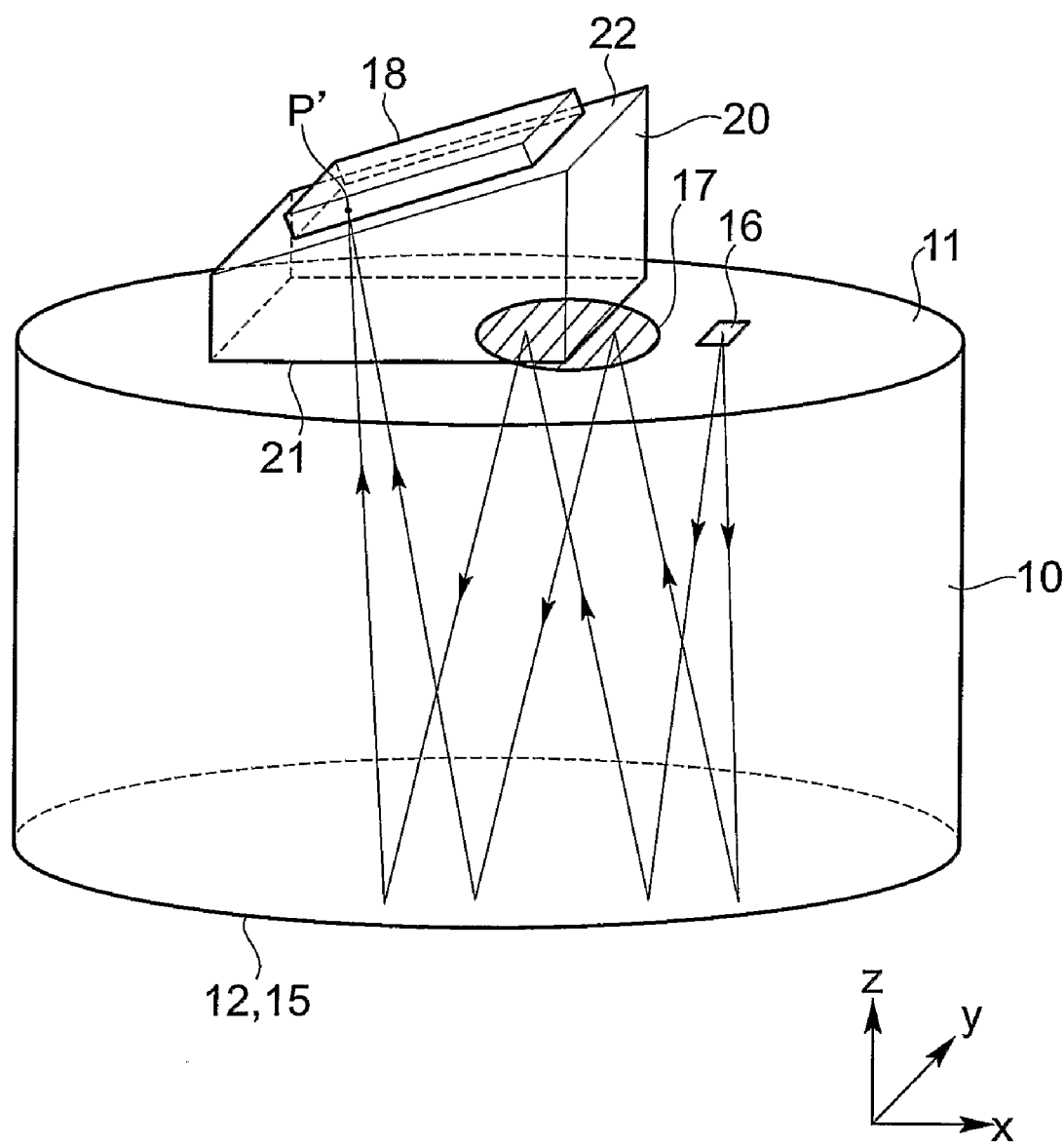
FIG. 4 is a perspective view showing a modified example of the spectrometer shown in FIG. 2.
Figure 5:
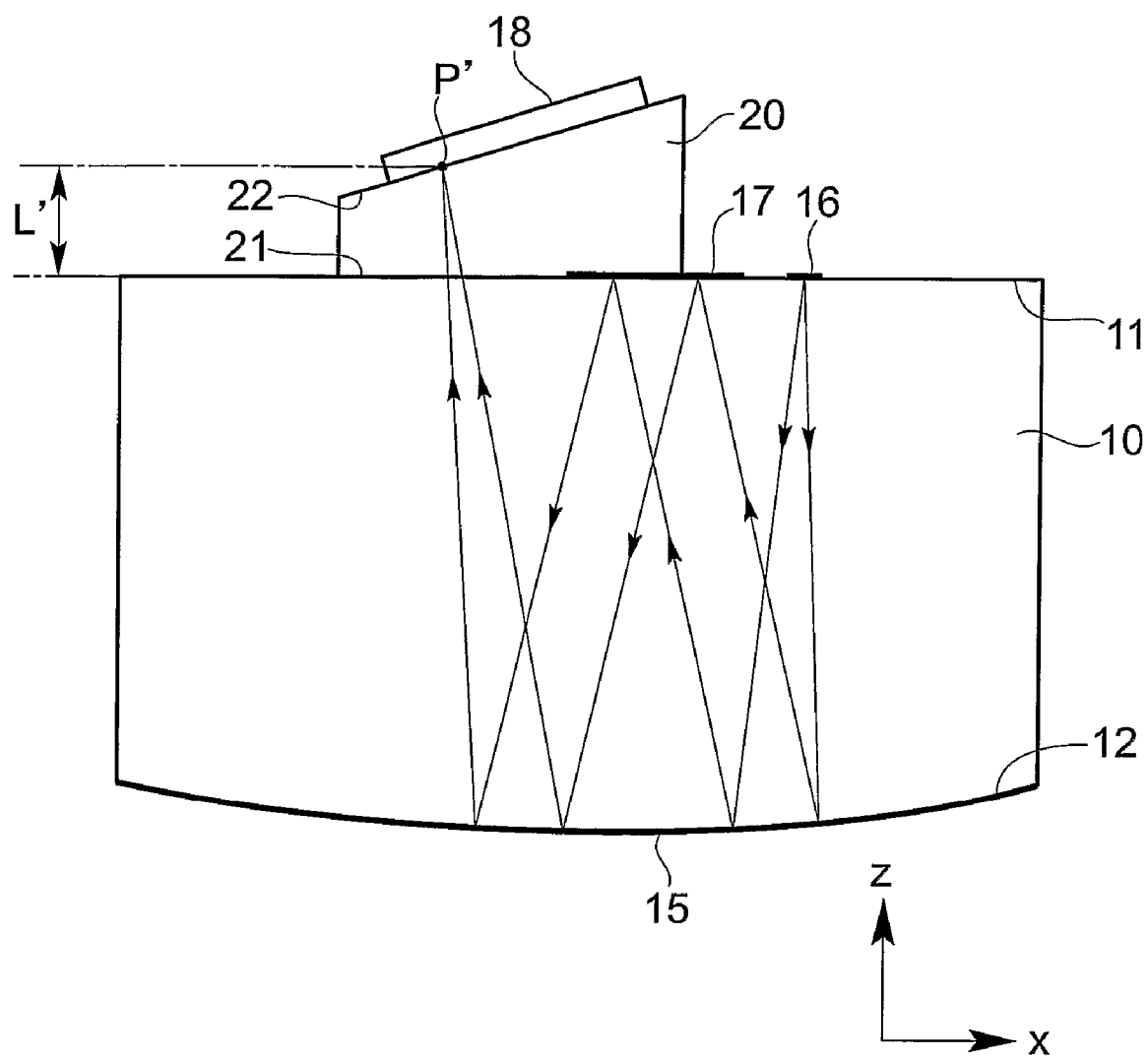
FIG. 5 is a side view showing a constitution of the spectrometer shown in FIG. 4.

FIG. 4 is an perspective view of a modified example of the spectrometer shown in FIG. 2. FIG. 5 is a side view, as seen from the negative side of the y-axis, of the constitution of the spectrometer shown in FIG. 4. In this modified example, as shown in FIG. 5, the focal distance from the upper surface 11 of the optical body 10 to the focal point P' for the object light is L' which is smaller than L (L'<L).

In this constitution, the wedge-shaped optical connection member 20 is displaced to the positive direction of the x-axis in comparison with the constitution shown in FIG. 2. In this way, the optical connection member 20 is placed so that the focal point P' of the object light entering the photodiode array 18 is located on the light exit surface 22. Thus, with the spectrometer of the above constitution using the optical connection member 20, the position of the light exit surface 22 for the focal point of the object light entering the photodiode array 18 from the optical body 10 through the optical connection member 20 is adjusted by adjusting the position in the x-axis direction of the optical connection member 20 according to the distance from the upper surface 11 of the optical body 10 to the focal point.

Here, if the focus position of the object light changes in the x-axis or y-axis direction, it is possible to cope with the change by adjusting the position of the photodiode array relative to the optical body within the x-y plane. On the other hand, in the case the focus position of the object light changes in the z-axis direction, with the constitution in which the photodiode array is placed directly on the upper surface of the optical body, the position of the photodiode array cannot be adjusted in the z-axis direction. In contrast to this, with the above constitution in which the wedge-shaped optical connection member 20 is interposed between the optical body 10 and the photodiode array 18, even if the focus position of the object light changed in the light path direction, it is possible to adjust the positional relationship between the light separation path within the optical body 10 and the optical connection member 20 and the photodiode array 18 by adjusting the position of the optical connection member 20 in the direction of tilt. It is also possible, after adjusting the position of the optical connection member 20 in the tilt direction and adjusting the focus position of the object light to the light exit surface 22, to further adjust the position of the photodiode array 18 on the light exit surface 22. In this way, it is possible to adjust the entry position of the object light to the photodiode array 18 while placing the focus position of the object light unchanged on the light exit surface 22.

Incidentally, in the above embodiment, the optical body 10 and the optical connection member 20 in which the light separation path of the object light is set are made of glass. In general, the optical body 10 and the optical connection member 20 may be made of any material as long as it permits passage of object light having wavelengths within a specified range as the object of light separation for example a resin material.

Besides, as the light entry means placed for the light separation path in the optical body 10, the light entry slit 16 is shown in a simplified drawing in the above embodiment. Specifically, the light entry means may be of any constitution such as of a slit-formed pattern, a slit member, etc. As for the dispersing element for separating the object light too, other optical elements than the diffraction grating may be used. Besides, as for the light detection means for detecting the spectrally separated object light, other photodetector than the photodiode array may be used.

The constitution of the spectrometer according to this invention is further described.

Figure 6:
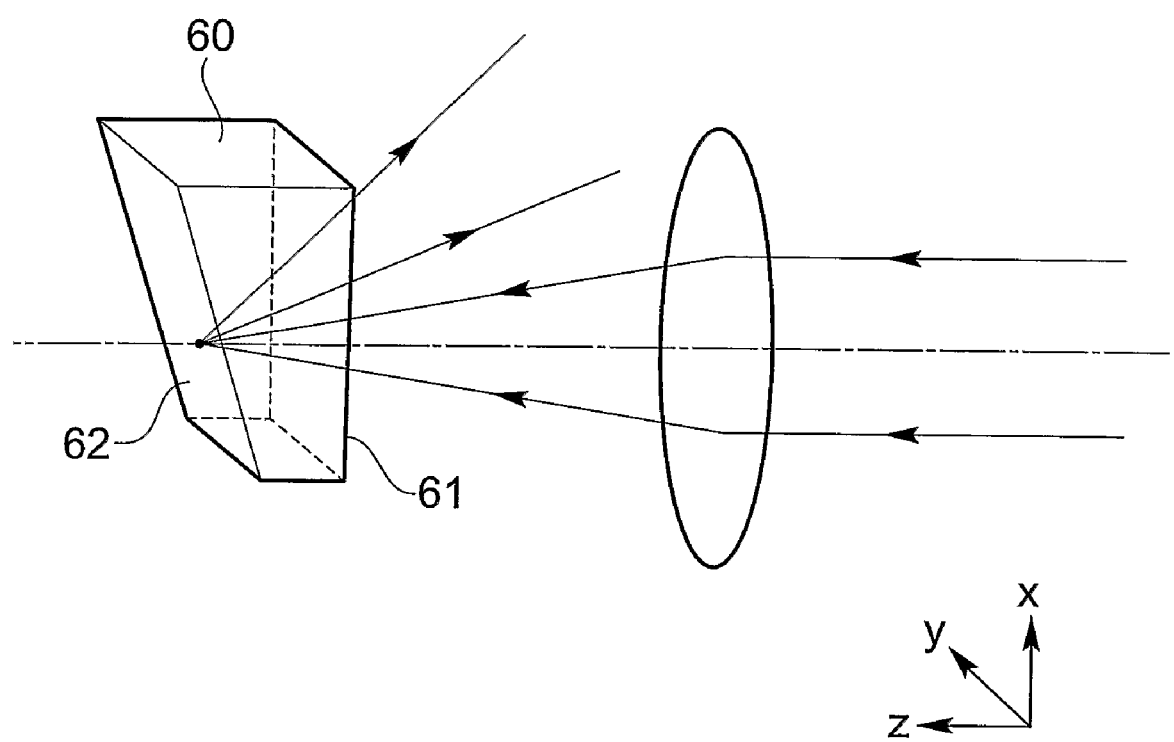
FIG. 6 is a figure showing the light reflected at the light exit surface of the wedge-shaped optical member.

With the constitution of the spectrometer in which the object light is separated and detected with the photodetector, there are cases in which part of the object light is reflected at the light entry surface of the photodetector as the object light enters the photodetector. Such reflected light may become stray light within the spectrometer and may cause low stray light suppression and low resolution. In contrast, with the above constitution in which the wedge-shaped optical member is placed on the optical path of the object light, as shown in FIG. 6, since the light exit surface 62 of the optical member 60 corresponding to the light entry surface of the photodetector is tilted relative to the light entry surface 61, it is possible to arrange that the light reflected at the light exit surface 62 propagates in the direction deviating from the light entry path of the object light.

Figure 7:
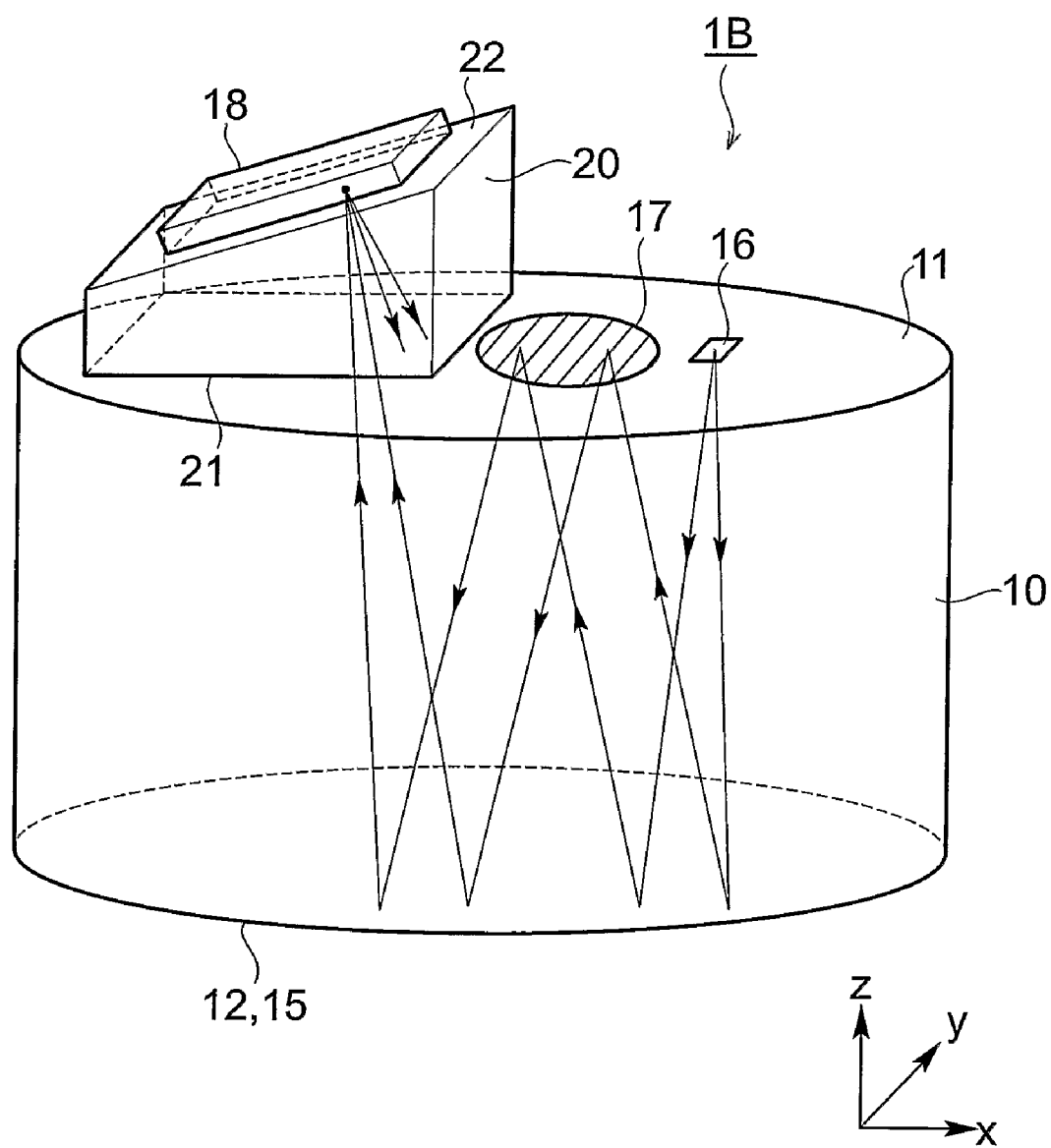
FIG. 7 is a perspective view showing a constitution of the second embodiment of the spectrometer.

FIG. 7 is a perspective view showing the constitution of a second embodiment of the spectrometer according to the invention. A spectrometer 1B of this embodiment is of similar constitution to that of the spectrometer 1A shown in FIG. 2, and includes: the optical body 10, the optical connection member 20, the reflecting mirror 15, the light entry slit 16, the diffraction grating 17, and the photodiode array 18.

In this embodiment, the optical connection member 20 is constituted that its light exit surface 22 is tilted by a specified angle from the light separation path of the object light coming from the optical body 10, passing through the optical connection member 20, and entering the photodiode array 18. Thus, the spectrometer 1B is constituted that when part of the object light coming from the diffraction grating 17 and reaching the light exit surface 22 through the reflecting mirror 15 is reflected at the light exit surface 22, the reflected light propagates in the direction deviating from the light separation path of the object light.

With the above constitution, it is possible to provide a stray light trap for trapping the stray light on the light path of the reflected light at a position removed from the light separation path of the object light. In this way, it is possible to restrict the influence of stray light produced when the object light enters the photodiode array 18 connected to the light exit surface 22 of the optical connection member 20. As for the tilt angle of the light exit surface 22 of the optical connection member 20 relative to the light separation path of the object light, it may be appropriately set according to specific constitution of the spectrometer. The tilt angle may be set for example to about 5 degrees.

Here, the reflection of object light at the light entry surface of the photodiode array 18 occurs due to difference in refractive index between the optical body 10 and the optical connection member 20, and the photodiode array 18. For example, if glass members are used as the optical body 10 and the optical connection member 20, their refractive index is about 1.5. If silicon sensors are used as the photodiode array 18, their refractive index is about 3.4. In such a constitution, about 15% of the object light entering the photodiode array 18 is reflected.

Figure 8:
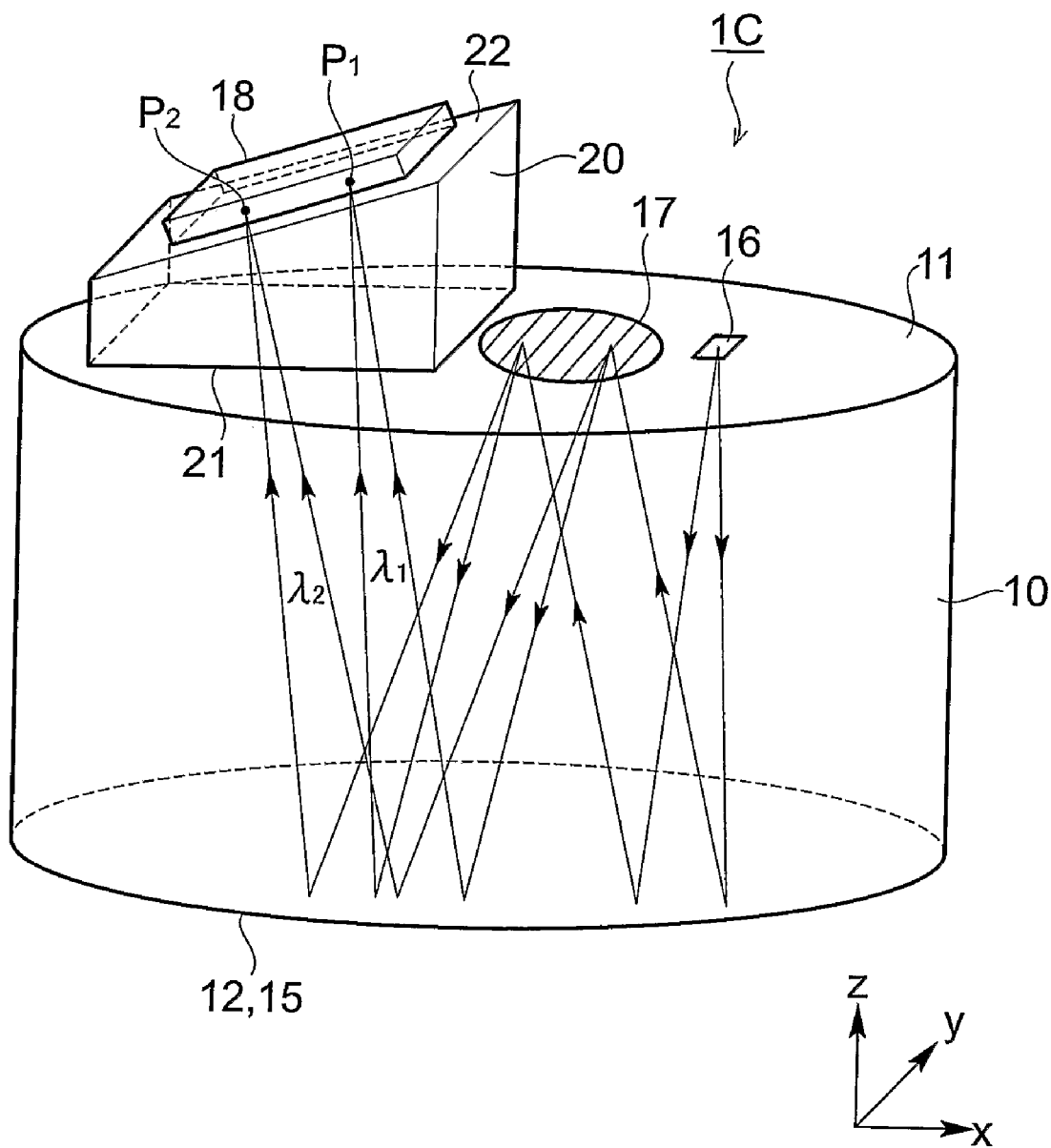
FIG. 8 is a perspective view showing a constitution of the third embodiment of the spectrometer.

FIG. 8 is a perspective view showing the constitution of a third embodiment of the spectrometer according to the invention. A spectrometer 1C of this embodiment is of similar constitution to that of the spectrometer 1A shown in FIG. 2, and includes: the optical body 10, the optical connection member 20, the reflecting mirror 15, the light entry slit 16, the diffraction grating 17, and the photodiode array 18.

This embodiment is arranged that, for the object light separated with the diffraction grating 17, the focus line formed on the exit side of the light separation path according to wavelengths is tilted relative to the upper surface 11 of the optical body 10. For such a focus line of the object light, the optical connection member 20 is constituted that its light exit surface 22 lies along the focus line. As for the focus line according to wavelengths, FIG. 8 shows two focal points $P_1$ and $P_2$ on the light exit surface 22 corresponding to two wavelengths $\lambda_1$ and $\lambda_2$.

The above constitution makes it possible to favorably detect with the photodiode array 18 the spectral components of the object light by separating it with the diffraction grating 17. For example, when an object light enters obliquely the photodiode array 18, since the reflection rate of the object light at the light entry surface ends up in depending on the polarized state of the object light, polarization-dependent loss occurs in the object light. In contrast to this, constituting that the light exit surface 22 of the optical connection member 20 tilted relative to the upper surface 11 of the optical body 10 is placed along the focus line makes an arrangement possible in which the object light enters at right angles to the photodiode array 18 to prevent at the occurrence of polarization-dependent losses.

The spectrometer according to this invention is not limited to the above embodiments but may be modified in various ways. For example, as for the constitution of the spectrometer using the light entry means, the dispersing element, and the light detection means, or as for the constitution of the light separation path set within the optical body, various specific constitutions other than the above may be used. As for the placement of respective optical elements relative to the optical body described above too, as well as for the light separation path, various modifications may be made. For example, in the constitution shown in FIG. 2, while the light entry slit 16, the diffraction grating 17, and the photodiode array 18 are all placed on the upper surface 11 side relative to the optical body 10, a constitution may be made in which they are placed respectively different surface sides.

INDUSTRIAL APPLICABILITY

This invention can be used as a spectrometer that brings about sufficient placement accuracy of optical elements in a simple constitution at a low cost. Namely, the spectrometer of this invention makes it possible to bring about sufficient placement accuracy of optical elements with a simple constitution while reducing cost by interposing an optical connection member, with its light exit surface tilted relative to its light entry surface, between an optical body and a light detection means on the light exit side of a light separation path set within the optical body.

The invention claimed is:

1. A spectrometer comprising:
   an optical body made of a material that permits passage of an object light, to be an object of light separation, of wavelengths within a specified range, with a light separation path for the object light to propagate set therein;
   a dispersing element provided in a specified position to be on the light separation path;
   a light entry means located on the entry side of the light separation path to permit the object light to enter;
   a light detection means located on the exit side of the light separation path to detect the object light entering through the light entry means and spectrally separated with the dispersing element; and
   an optical connection member for optically interconnecting the optical body and the light detection means,
   wherein the optical connection member is formed so that a light entry surface for the object light separated with the dispersing element is in contact with a specified surface of the optical body, a light exit surface on the opposite side of the light entry surface is in contact with the light detection means, and the light exit surface is tilted by a specified angle relative to the light entry surface.

2. The spectrometer as claimed in claim 1, wherein the optical connection member is constituted such that reflected light, which is part of the object light coming from the dispersing element and being reflected at the light exit surface, propagates in a direction deviating from the light separation path.

3. The spectrometer as claimed in claim 1, wherein the optical connection member is constituted such that the light exit surface lies along a focus line produced according to the wavelengths of the object light spectrally separated with the dispersing element.

4. The spectrometer as claimed in claim 1, wherein the specified angle is 5 degrees.

5. The spectrometer as claimed in claim 1, wherein the light exit surface tilts the light detection means at the specified angle.

6. The spectrometer as claimed in claim 5, wherein the specified angle is 5 degrees.

* * * * *